(12) United States Patent
Sivakumar et al.

(10) Patent No.: US 8,761,202 B2
(45) Date of Patent: Jun. 24, 2014

(54) ARCHITECTURE FOR DYNAMICALLY ADAPTIVE TRANSPORT PROTOCOLS

(76) Inventors: Raghupathy Sivakumar, Atlanta, GA (US); Aravind Velayutham, Atlanta, GA (US)

( * ) Notice: Subject to any disclaimer, the term of this patent is extended or adjusted under 35 U.S.C. 154(b) by 1353 days.

(21) Appl. No.: 11/235,444

(22) Filed: Sep. 26, 2005

(65) Prior Publication Data

US 2006/0067333 A1 Mar. 30, 2006

Related U.S. Application Data

(60) Provisional application No. 60/613,263, filed on Sep. 27, 2004.

(51) Int. Cl.
*H04J 3/16* (2006.01)
*H04L 1/00* (2006.01)

(52) U.S. Cl.
USPC ........... 370/469; 370/465; 370/466; 370/468; 370/229; 709/223; 709/224; 709/227

(58) Field of Classification Search
USPC ......... 370/465, 466, 468, 469, 228, 229, 252, 370/249, 389, 395.52; 709/224, 235, 223, 709/227; 714/3, 11; 712/28
See application file for complete search history.

(56) References Cited

U.S. PATENT DOCUMENTS

| | | | |
|---|---|---|---|
| 6,076,113 A | 6/2000 | Ramanathan et al. | |
| 6,721,872 B1 * | 4/2004 | Dunlop et al. | 712/28 |
| 6,757,255 B1 | 6/2004 | Aoki et al. | |
| 6,771,594 B1 | 8/2004 | Upadrasta | |
| 7,020,701 B1 * | 3/2006 | Gelvin et al. | 709/224 |
| 7,076,555 B1 * | 7/2006 | Orman et al. | 709/227 |
| 7,251,745 B2 * | 7/2007 | Koch et al. | 714/11 |
| 7,394,764 B2 * | 7/2008 | Ramani et al. | 370/231 |
| 7,844,730 B2 * | 11/2010 | Kawaguchi | 709/238 |
| 2004/0054766 A1 * | 3/2004 | Vicente | 709/223 |
| 2005/0021821 A1 * | 1/2005 | Turnbull et al. | 709/232 |
| 2005/0160306 A1 * | 7/2005 | Okunseinde et al. | 714/3 |

* cited by examiner

*Primary Examiner* — Charles C Jiang
*Assistant Examiner* — Jamal Javaid
(74) *Attorney, Agent, or Firm* — Ballard Spahr LLP

(57) ABSTRACT

Systems and methods for reconfiguring a transport-layer protocol are disclosed. The transport-layer protocol is implemented by a plurality of transport-layer mechanisms. Each transport-layer mechanism resides in a dynamically loadable module and implements a specific area of transport-layer functionality. One method comprises: performing an initial load of a first plurality of transport-layer mechanisms into memory; unloading one of the first plurality of transport-layer mechanisms; and loading at least one transport-layer mechanism different than the first plurality. One system comprises a processor coupled to a local interface; a memory coupled to the local interface; and protocol logic stored in the memory and executable by the processor. The protocol logic comprises: monitor logic configured to detect a change in at least one network performance condition of a network communicatively coupled to the network interface; adaptation logic configured to load into the memory a transport-layer mechanism upon a notification by the monitor logic.

23 Claims, 16 Drawing Sheets

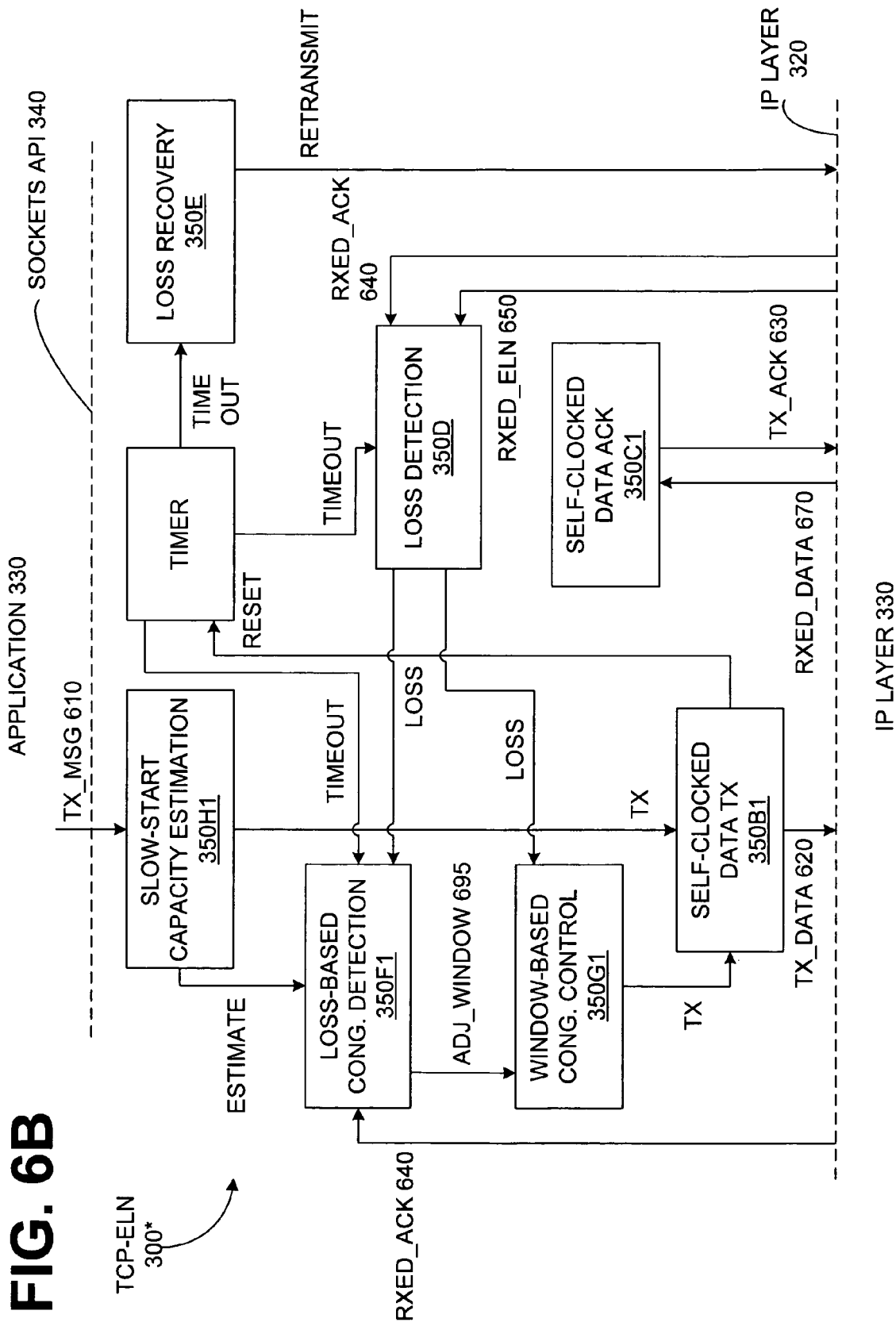

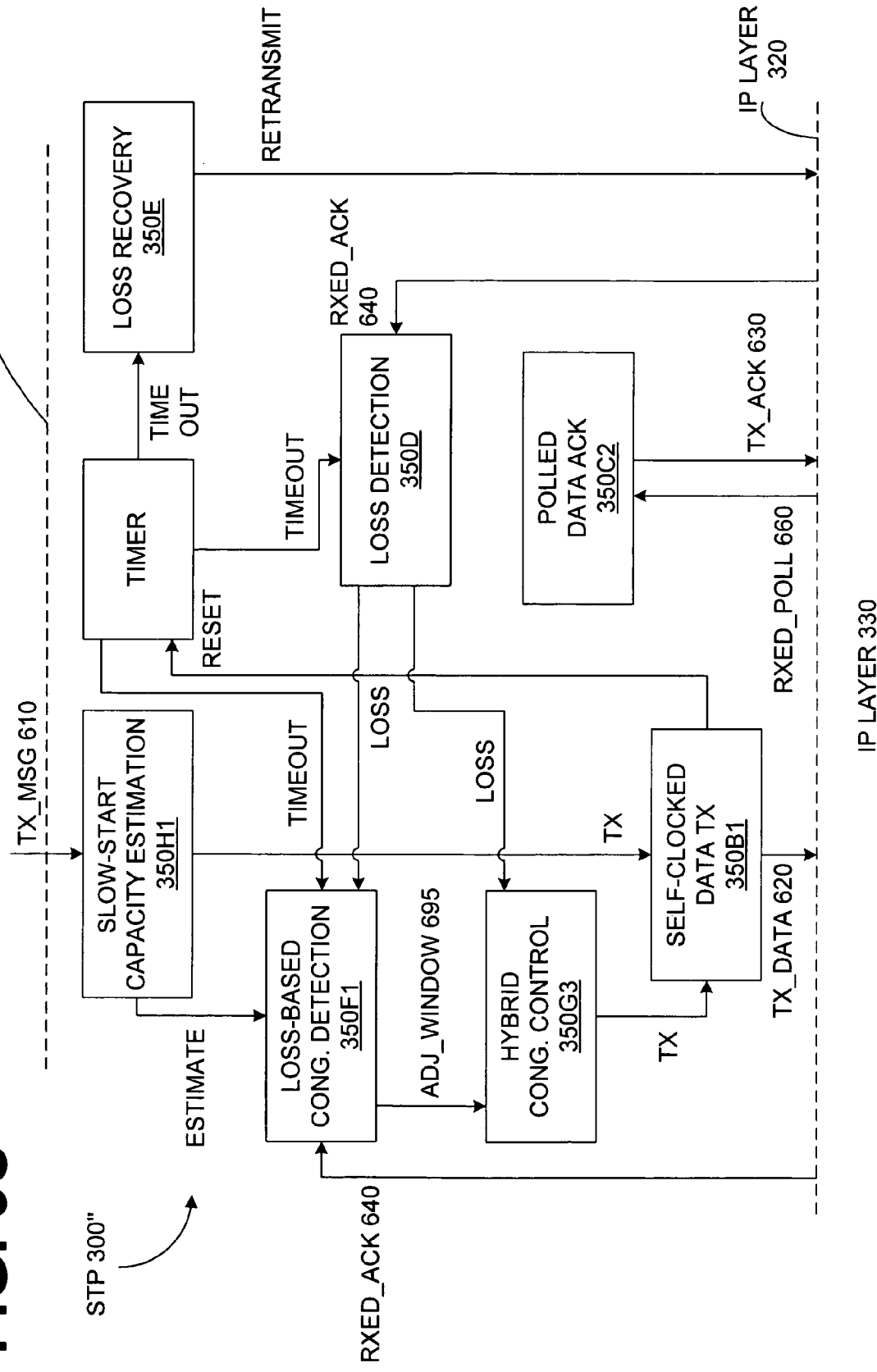

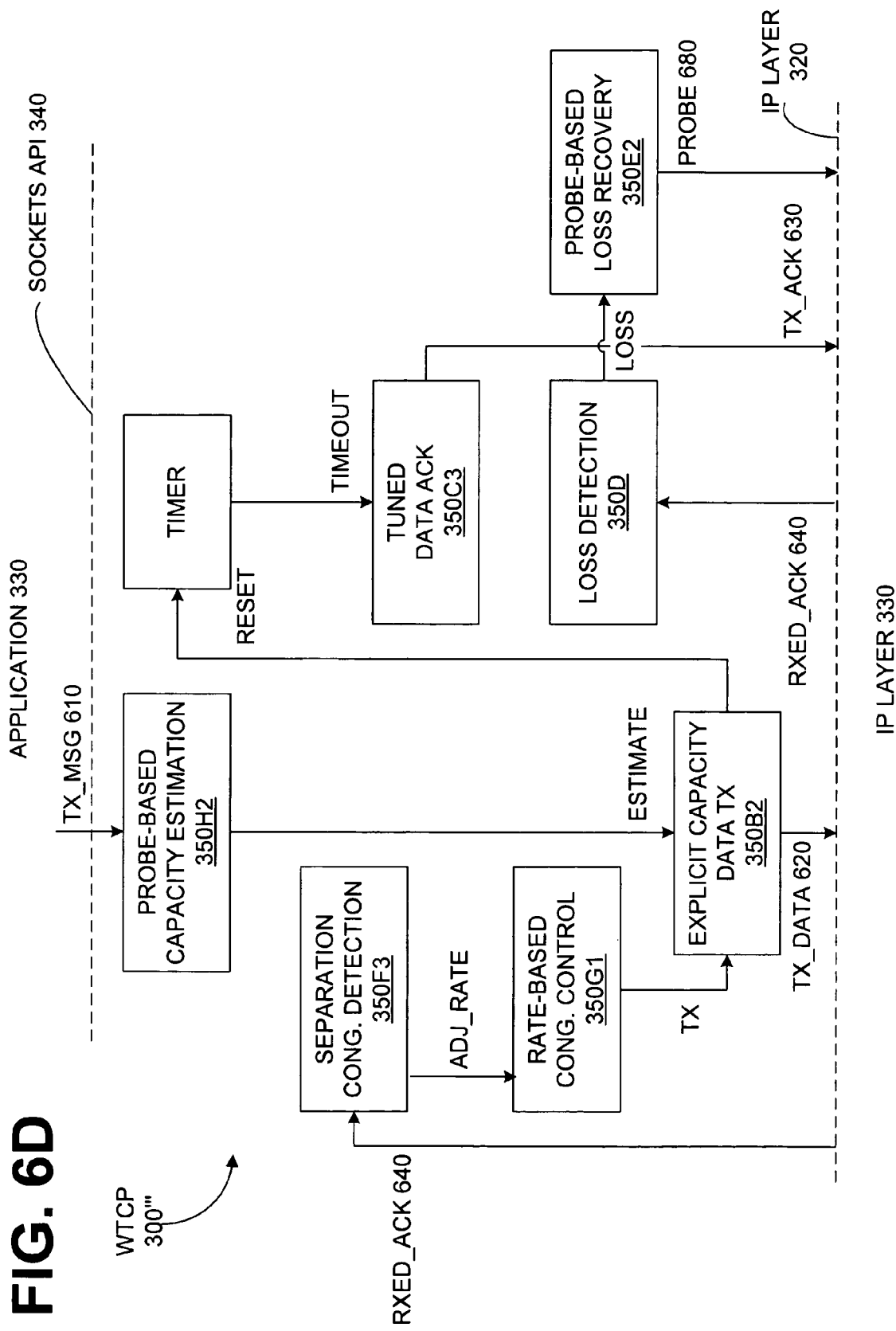

ARCHITECTURE FOR DYNAMICALLY ADAPTIVE TRANSPORT PROTOCOLS

CROSS REFERENCE TO RELATED APPLICATIONS

This application claims the benefit of U.S. Provisional 60/613,263, filed Sep. 27, 2004, which is entirely incorporated by reference.

STATEMENT REGARDING FEDERAL SUPPORT OR DEVELOPMENT

This work was supported in part by Grant Nos. ANI-0117840 and ECS-0225497 awarded by the National Science Foundation. Accordingly, the U.S. government may have certain rights in the claimed subject matter.

FIELD OF THE INVENTION

The present invention relates to computer networks, and more specifically, to a dynamically adaptive transport protocol architecture.

BACKGROUND

The world-wide network known as the "Internet" is composed of many different smaller networks that are all interconnected at the network layer (layer 3 of the OSI protocol model). By definition, the Internet uses Internet Protocol (IP) as its network layer, so that the Internet is homogeneous at the network layer. However, the Internet is very heterogeneous at the lower layers: the link layer (layer 2) and the physical layer (layer 1).

At the link layer, most local area networks (LANs) use some form of Ethernet, but the performance characteristics of these various forms of Ethernet vary widely. For example, Ethernet ranges from the 1 Mbps offered by wireless links such as 802.11 (WiFi) to 10 Mbps and even Gbps offered by various 802.3 wired links. Wide area network (WAN) links tend to offer much lower performance as compared to LAN links. For example, a T1 link offers 1.25 Mbps and a digital subscriber loop (DSL) link ranges from 2 Mbps to 10 Mbps.

Thus, the path from one Internet endpoint to another consists of links with varying performance characteristics, as measured, for example, in terms of bandwidth, delay, and rate of packet loss. Furthermore, the network conditions may change over time, for example, the delay on a path may increase as network traffic increases, or as rerouting from one link to another takes place. These changes can occur from session to session or even within a single session.

A conventional transport-layer protocol periodically characterizes network conditions, (e.g., bandwidth, delay, and packet loss) and can adapt to some level of change in network conditions. A conventional adaptation, for example, is to increase or decrease the congestion window. However, this sort of adaptation is limited—when a significant change in network condition occurs (e.g., a large change in bandwidth or delay), a conventional transport-layer protocol will suffer from reduced performance, as its adaptations are not flexible enough to accommodate the change.

One prior art approach to adapting the transport layer is replacing one transport-layer protocol with another between transport sessions. The dominant transport-layer on the Internet is Transport Control Protocol (TCP). TCP now exists in many variant forms, each designed to improve performance in a certain type of network environment. Examples are TCP with Selective Acknowledgement (TCP-SACK), TCP-Vegas, TCP with Explicit Loss Notification (TCP-ELN), and Wireless TCP (WTCP).

This prior art approach allows one variant of TCP to be replaced by another variant, but only after a session is complete. This prior art approach is limited because the protocol does not adapt during the operation of the transport protocol. Therefore, an improved transport protocol which adapts dynamically is desirable.

SUMMARY

Systems and methods for reconfiguring a transport-layer protocol are disclosed. The transport-layer protocol is implemented by a plurality of transport-layer mechanisms. Each transport-layer mechanism resides in a dynamically loadable module and implements a specific area of transport-layer functionality. One method comprises: performing an initial load of a first plurality of transport-layer mechanisms into memory; unloading one of the first plurality of transport-layer mechanisms; and loading at least one transport-layer mechanism different than the first plurality. One system comprises a processor coupled to a local interface; a memory coupled to the local interface; and protocol logic stored in the memory and executable by the processor. The protocol logic comprises: monitor logic configured to detect a change in at least one network performance condition of a network communicatively coupled to the network interface; adaptation logic configured to load into the memory a transport-layer mechanism upon a notification by the monitor logic.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention.

FIGS. 6A-D are state diagrams for four transport protocols implemented in accordance with the dynamically adaptive transport protocol architecture.

DETAILED DESCRIPTION

The systems and/or methods of the dynamically adaptive transport protocol architecture can be implemented in software, hardware, or a combination thereof. In some embodiments, the system and/or method is implemented in software that is stored in a memory and that is executed by a suitable microprocessor (uP) situated in a network device. However, system and/or method, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1A:
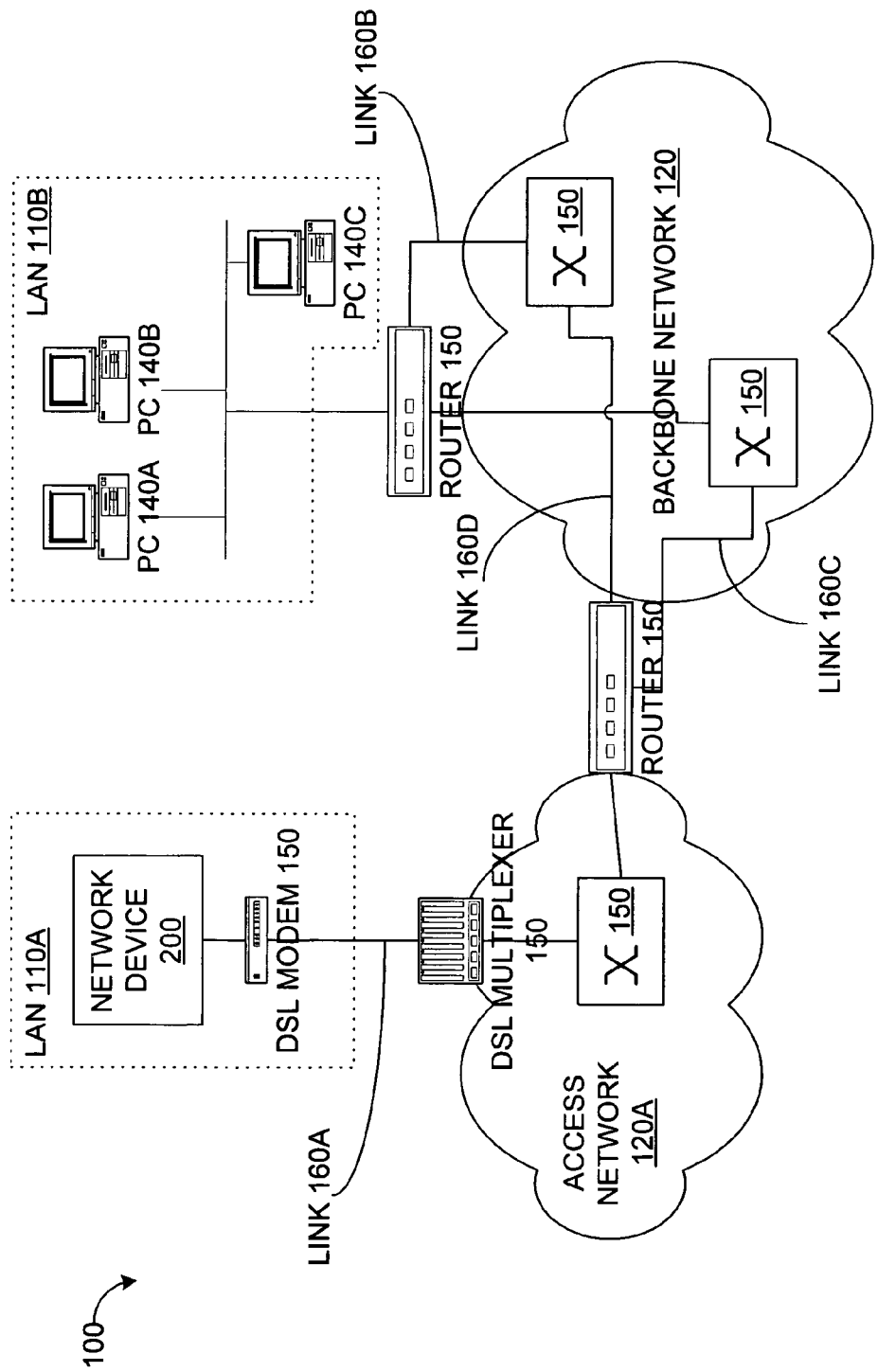
FIGS. 1A-C are diagrams of various exemplary networks, each containing a client network device implementing a transport protocol in accordance with the dynamically adaptive transport protocol architecture.
Figure 1B:
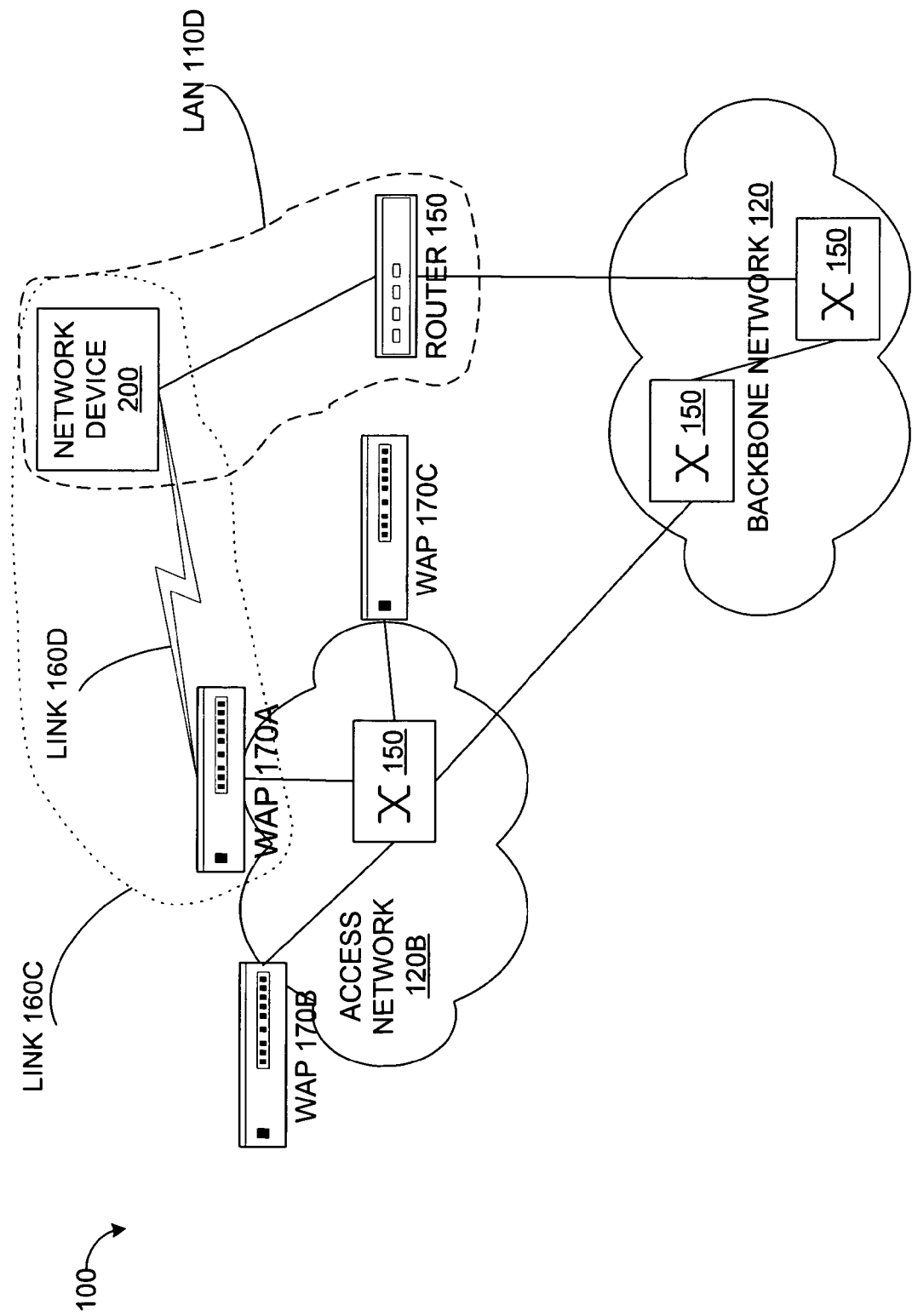
Figure 1C:
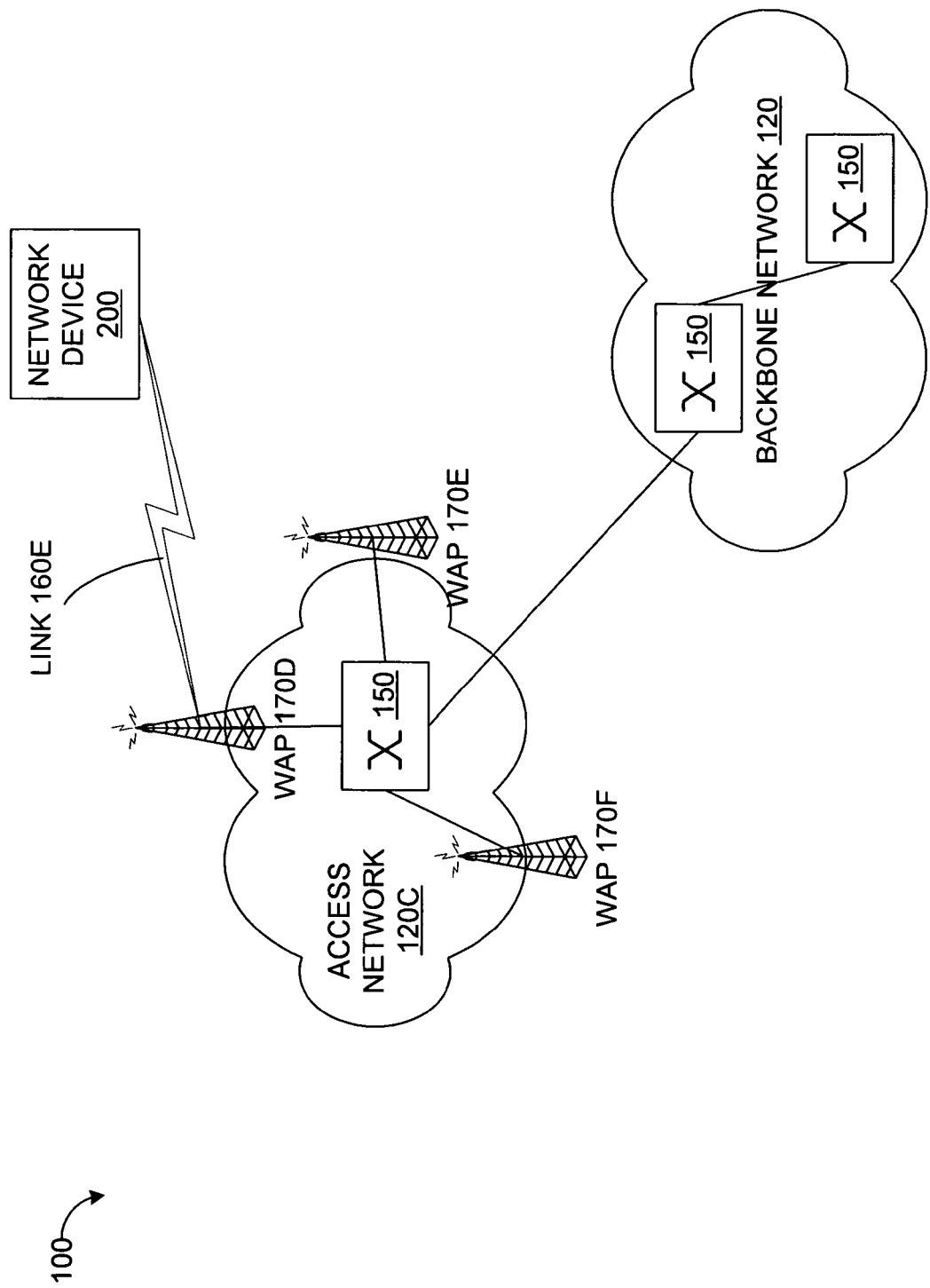

FIGS. 1A-C are diagrams of various exemplary networks 100, each containing a client network device 200, where the client network device 200 implements a transport protocol (not shown) in accordance with the dynamically adaptive transport protocol architecture. In the example network of FIG. 1A, the entire network 100 can be viewed as comprising four subsets: two LANs 110A, 110B; an access network 120; and a backbone network 130. The client network device 200, residing in residential LAN 110A, is an endpoint, as are servers 140, which reside in a corporate LAN 110B.

Residential LAN 110A connects to the backbone network 130 through a DSL access network 120A. Corporate LAN 110B connects to the backbone network 130 through a router 150 with a T1 connection. Network equipment such as access nodes, routers, and switches (150) provide connectivity within the backbone network 130 and the access networks 120.

Various links 160 couple the endpoints (server 140 and client 200) to their respective LANs 110. Other links 160 couple the access nodes, routers, and switches (150) to each other. In combination, these links 160 provide paths through the network 100. In this manner, the endpoints 140 and 200 can communicate with each other.

As discussed earlier, different links 160 have different performance characteristics: link 160A is a 2 Mbps DSL link; link 160C is a 1.5 Mbps T1 link; link 160C is a 51 Mbps OC-1 link; and link 160D is a 155 Mbps OC-3 link. If link 160D goes out of service, and is replaced by link 160C, then the performance characteristics of a path through the backbone network 130 will change. The dynamically adaptive transport protocol architecture allows the transport protocol in client network device 200 to adapt its behavior, in real-time, when a change is detected in these performance conditions.

FIG. 1B illustrates another example network containing the client network device 200. In this example, the client network device 200 is part of a wireless LAN 110C and a wired LAN 110D. Wireless LAN 110C connects to the backbone network 130 through an access network 120B, gaining entry to the access network 120B at one of wireless access points 170A-C. Wired LAN 110D connects to the backbone network 130 through a router 150 with a T1 connection.

Typically, at any point in time the client network device 200 is part of one LAN 110 (e.g. wireless LAN 110C or wired LAN 110D). When the client network device 200 switches from wireless LAN 110C to wired LAN 110D, a "vertical handoff" occurs, during which the client network device 200 receives a new link-layer and/or IP address. This change in access networks usually results in a change in performance conditions, and the dynamically adaptive transport protocol architecture allows the transport protocol in client network device 200 to adapt its behavior appropriately.

FIG. 1C illustrates yet another example network containing the client network device 200. In this example, the client network device 200 is part of a wireless WAN 180 (e.g., a cellular data network). Wireless WAN 180 connects to the backbone network 130 through an access network 120C, gaining entry to the access network 120C at one of access points 170D-F. A "horizontal handoff" occurs when the client network device 200 switches from one access point 170 to another within the same access network 120. This change in access networks may result in a change in performance characteristics, and the dynamically adaptive transport protocol architecture allows the transport protocol in client network device 200 to adapt its behavior appropriately.

One skilled in the art will understand that the dynamically adaptive transport protocol architecture is applicable to a wide range of LAN, WAN, and access network technologies. The particular technologies discussed above are merely a representative sample, given for illustrative purposes.

A typical exchange of data between two computers over the Internet involves one computer acting in the role of client 200 and the other acting in the role of server 140. This is true for most Internet activities: web browsing, e-mail, downloading files, etc. The data exchange involves a series of transmissions and receptions, performed by both sides. For example: the first computer requests data, which involves sending; the second computer receives the request, and sends the requested data, so that the second computer performs both a send and a receive; next, the first computer receives the requested data. Thus, both server 140 and client 200 act as sender and as receiver.

The dynamically adaptive transport protocol architecture locates most of the transport layer intelligence in the client network device 200, regardless of whether the client is acting a sender or a receiver. Thus, changes to the transport protocol can be performed at the client network device 200, without intervention at the server 140. This feature is advantageous because one server 140 generally provides services for many clients 200 and it is desirable to minimize any periods of maintenance or upgrades on the server 140.

The dynamically adaptive transport protocol architecture is a client-centric framework, with the client acting as primary control for the operation of the transport protocol. The client network device 200 will be discussed in detail in later sections. A brief overview of the operation of the server side of the dynamically adaptive transport protocol architecture is as follows.

When the server 140 acts as a receiver, the server 140 sends feedback information used by the client network device 200 (sender), such as acknowledgements and/or selective acknowledgements. When acting as a sender, the server 140 responds to requests for data from the client network device 200. In other words, the server 140 plays a passive role, responding only to instructions sent by the client network device 200. Any adaptation of the transport protocol in order to accommodate changing network conditions occurs on the client network device 200 rather than the server 140.

Further details of the interaction between the client network device 200 and the server 140 can be found in "A Receiver-centric Transport Protocol for Mobile Hosts with Heterogeneous Wireless Interfaces" by H.-Y. Hsieh, K.-H. Kim, Y. Zhu, and R. Sivakumar (Proceedings of the $8^{th}$ Annual International Conference on Mobile Computing and Networking, 2002), and in A. Velayutham, H.-Y. Hsieh and R. Sivakumar, "On Transport Layer Adaptation in Heterogeneous Wireless Data Networks," (IEEE International Workshop on Quality of Service (IWQoS), University of Passau, Germany, June 2005), which are hereby incorporated by reference.

Figure 2:
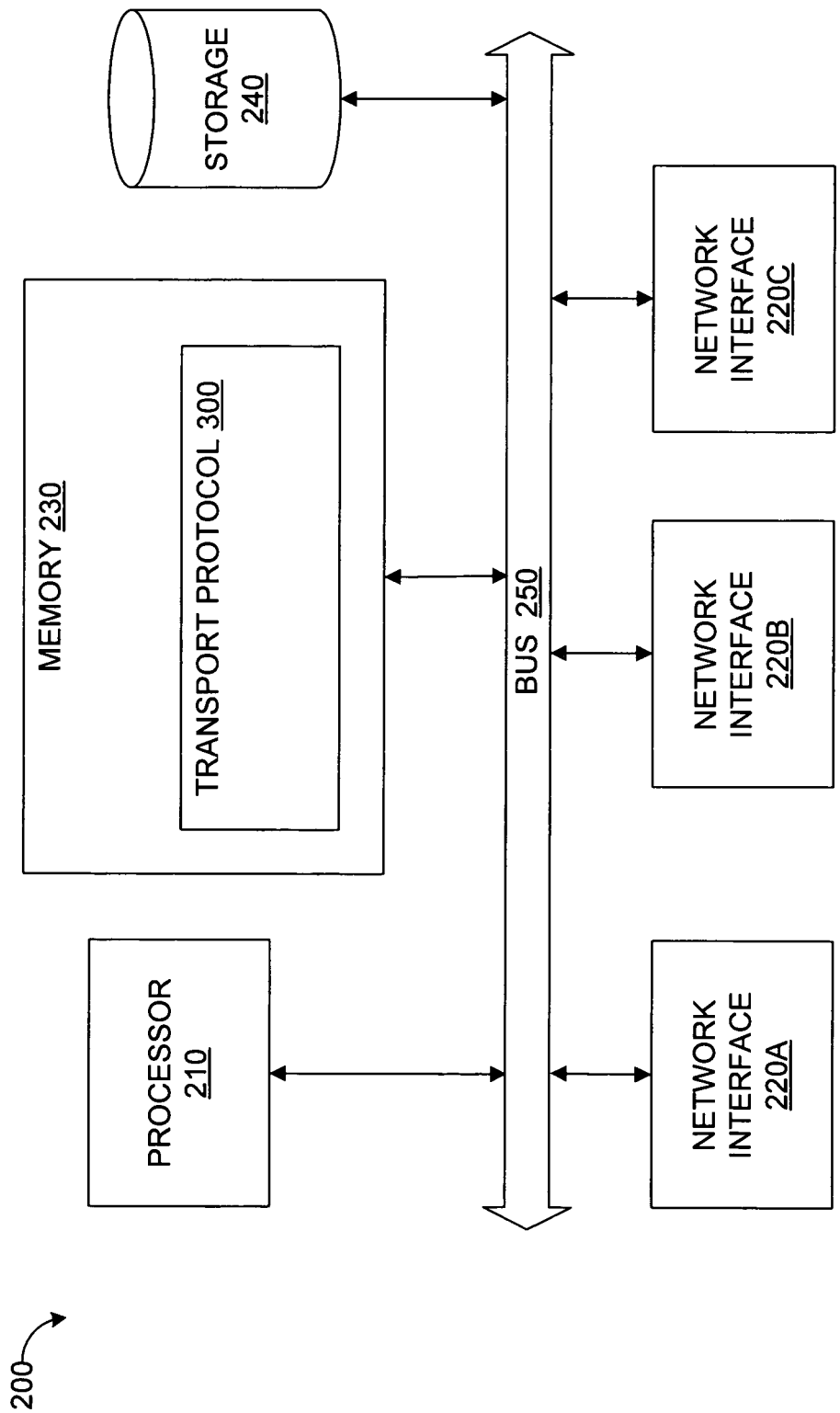
FIG. 2 is a hardware block diagram of the client network device 200 of FIG. 1.

FIG. 2 is a hardware block diagram of a client network device 200 in accordance with the dynamically adaptive transport protocol architecture. Client network device 200 contains a number of components that are well known in the art of data communications, including a processor 210, one or more network interfaces 220, memory 230, and non-volatile storage 240. Examples of non-volatile storage include, for example, a hard disk, flash RAM, flash ROM, EEPROM, etc. These components are coupled via bus 250. Memory 230 contains a transport protocol 300 in accordance with the dynamically adaptive transport protocol architecture.

Each of the network interfaces 220 is specific to a particular link layer. In FIG. 2, client network device 200 has three network interfaces: network interface 220A is an Ethernet (802.3) interface for connection to a wired LAN; network interface 220B is an WiFi (802.11) interface for connection to a wireless LAN; and network interface 220A is a General Packet Radio Service (GPRS) interface for connection to a wireless WAN. Omitted from FIG. 2 are a number of conventional components, known to those skilled in the art, that are not necessary to explain the operation of the dynamically adaptive transport protocol architecture.

Figure 3A:
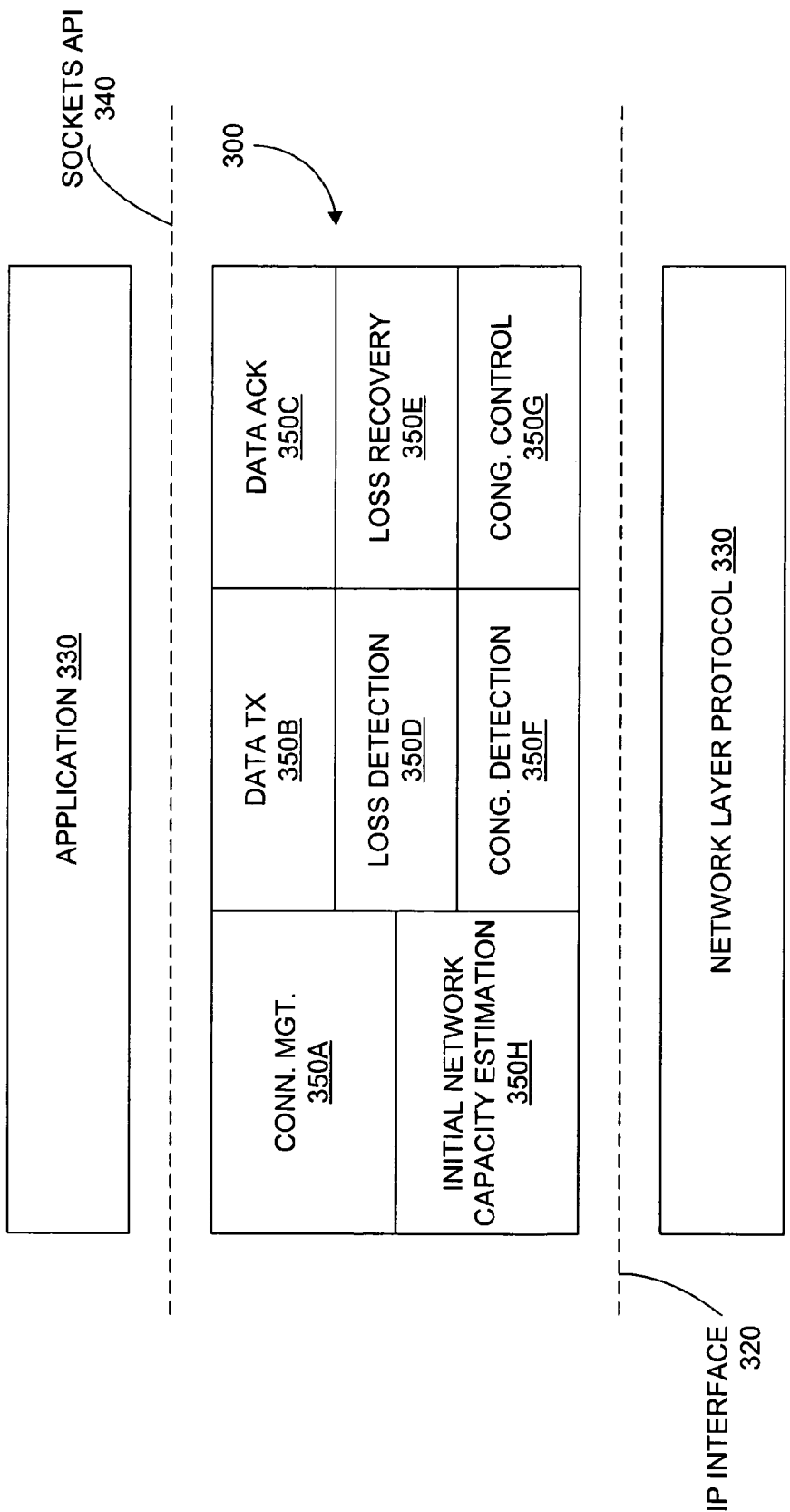
FIGS. 3A and 3B are high-level block diagrams of a protocol stack which includes the transport protocol 300 of FIG. 2.

FIG. 3A is a high-level block diagram of a protocol stack which includes the transport protocol 300 of FIG. 2. A protocol stack comprises various protocol layers bound together. At its logical lower edge, the transport protocol 300 interfaces to a network protocol 310, such as IP. This interface (320) between the transport protocol 300 and the network protocol 310 is operating-system specific. At its logical upper edge, the transport protocol 300 interfaces to an application 330 or a session-layer protocol. In a preferred embodiment, this interface (340) between the transport protocol 300 and the application 330 conforms to the Sockets Application Programming Interface (API). Not shown is the link-layer (or MAC-layer) protocol under the network protocol 310, or the network interface 220 bound to the link-layer protocol.

The transport protocol 300 can be viewed as a combination of modules 350, each implementing a transport functionality: connection management 350A; data transmission 350B; data reception and acknowledgement 350C; loss detection 350D; loss recovery 350E; congestion detection 350F; congestion control 350G; and initial network capacity estimation 350H.

Figure 3B:
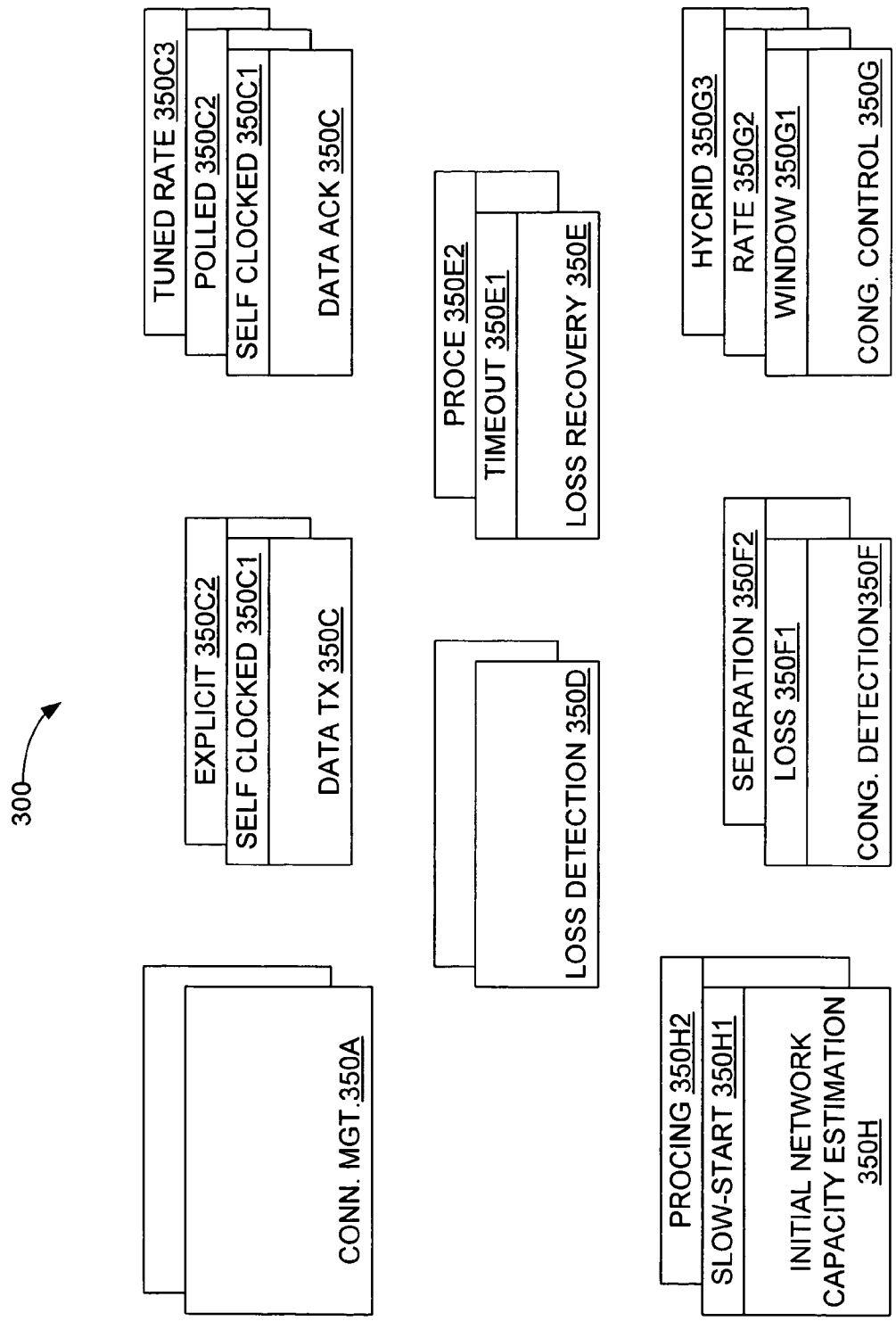

FIG. 3B is an alternate view of transport protocol 300. In the view of FIG. 3A, module 350 is generic: a congestion detection module 350F detects congestion, but the manner of detection is unspecified. FIG. 3B shows that a module 350 can implement its functionality through a particular mechanism. (To use an object-oriented analogy, the module would be a virtual base class and the mechanism would inherit from the base class.) One skilled in the art will understand that the following descriptions are merely examples of transport protocol mechanisms, and that other mechanisms are also possible.

Data transmission 350B can use a self-clocked mechanism 350B1 or an explicit-capacity mechanism 350B2. In the self-clocked mechanism 350B1, transmission of a data packet occurs only after the confirmation that a packet has exited the network. In contrast, the explicit-capacity mechanism 350B2 calculates the actual capacity of the network path, and transmits data according to this calculated capacity.

Self-clocked 350C1, polled 350C2, and tuned-rate 350C3 are alternative mechanisms for data reception and acknowledgement 350C. A receiver with the self-clocked acknowledgement mechanism 350C1 uses incoming packets as triggers for sending acknowledgements back to the sender. In the tuned-rate mechanism 350C3, the receiver sends acknowledgements back to the sender at a rate determined by the sender. A receiver using the polled acknowledgement mechanism 350C2 sends acknowledgments to the sender only when the sender explicitly requests (via a poll).

Alternative mechanisms for loss recovery 350E include timeout-based 350E1 and probe-based 350E2. Timeout-based loss recovery 350E1 works by having the sender maintain a timeout that is based on the round-trip time (RTT) of the connection, and also on the variation in RTT. The sender assumes data packet loss if acknowledgement is not received within this timeout period, and retransmits the data packet(s). A sender using probe-based recovery 350E2 sends data and waits for some threshold amount of time for an acknowledgement. If no acknowledgement is received, the sender transmits "probe" packets to solicit acknowledgement from the receiver.

Congestion detection 350F can be a loss-based mechanism 350F1, a delay-based mechanism 350F2 or an inter-packet-separation mechanism 350F3. For a loss-based congestion detection 350F1, packet loss is the primary indicator of congestion, whereas delay-based congestion detection 350F3 uses increasing network delay as the primary congestion indicator. The inter-packet-separation mechanism 350F3 monitors the separation between packet transmissions at the sender and packet receptions at the receiver. Congestion is indicated by an increase in inter-packet separation at the receiver as compared to the sender.

Alternative mechanisms for congestion control 350G include window-based 350G1, rate-based 350G2, or a hybrid 350G3 (which combines window-based and rate-based). The window-based mechanism 350G1 chooses a "congestion window" size, which is used as a proxy for estimated network capacity. The sender transmits up to that window size, so that, at any given instant, the amount of data outstanding in the network is equal to the window size. A sender using the rate-based mechanism 350G2 calculates a transmission rate based on RTT, and transmits at that rate. When using the hybrid mechanism 350G3, a sender transmits at a rate based on the congestion window and the RTT.

Initial network capacity estimation 350H can use a slow-start mechanism 350H1 or a probing mechanism 350H2 in order to estimate the network capacity of the end-to-end path. The slow-start mechanism 350H1 starts with an small estimate, and increments the data transmission rate/window exponentially until congestion is detected. The probing mechanism 350H2 transmits a pair of packets and estimates the delay between the two packets as received by the receiver.

Figure 4A:
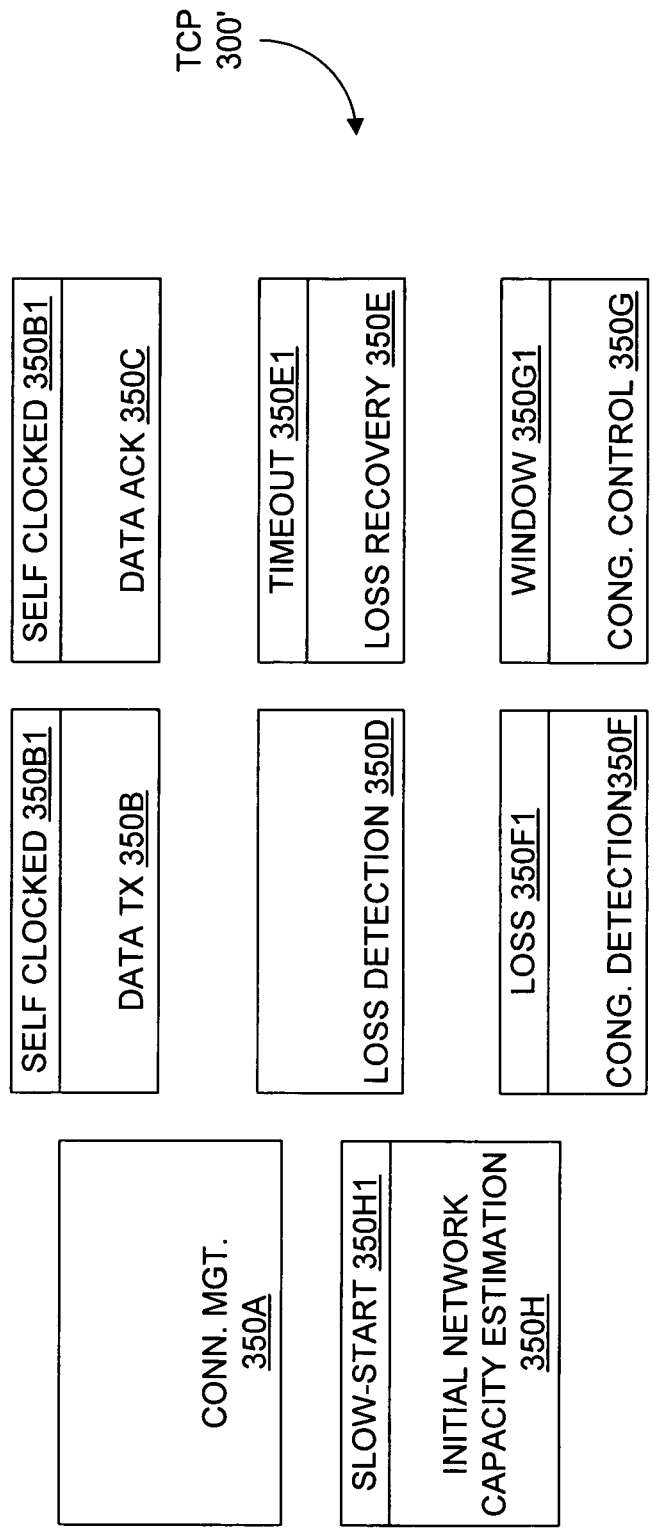
FIGS. 4A-4C are functional block diagrams of transport protocols implemented in accordance with the dynamically adaptive transport protocol architecture.
Figure 4B:
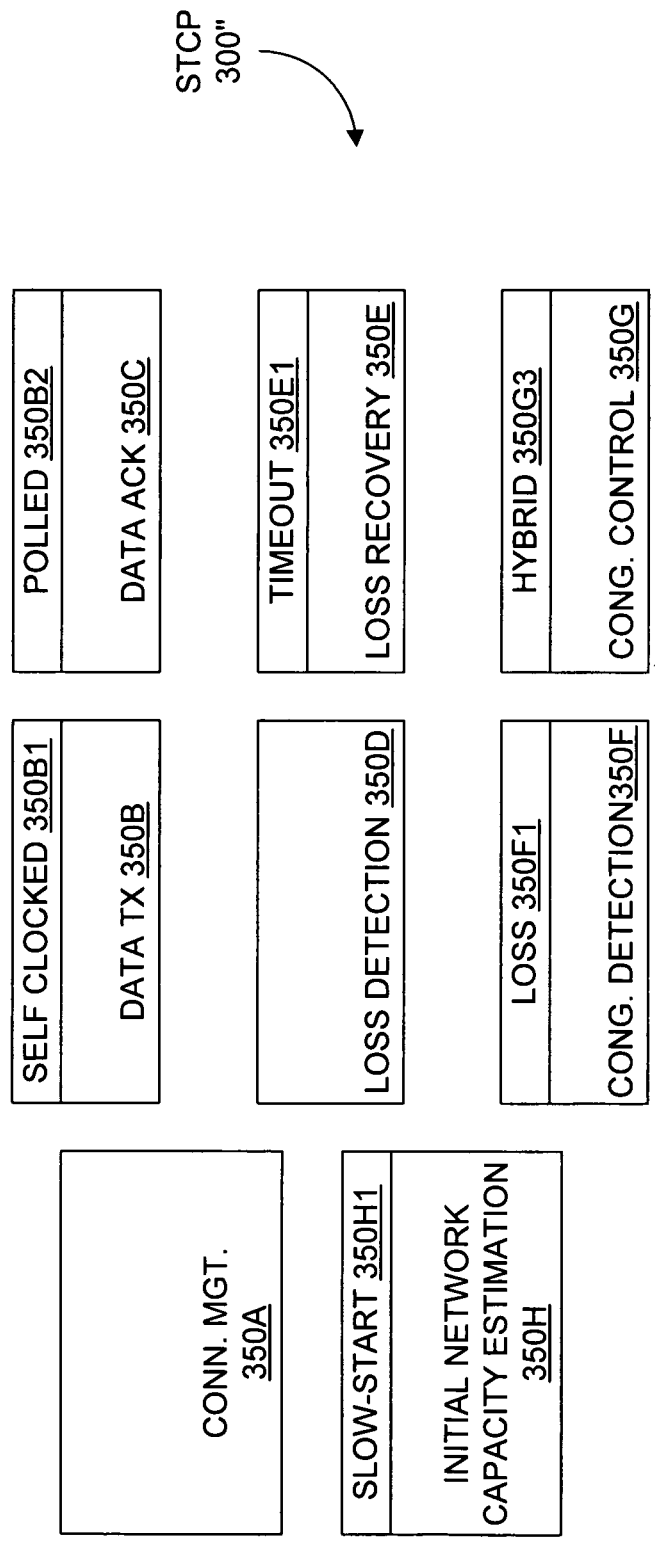
Figure 4C:
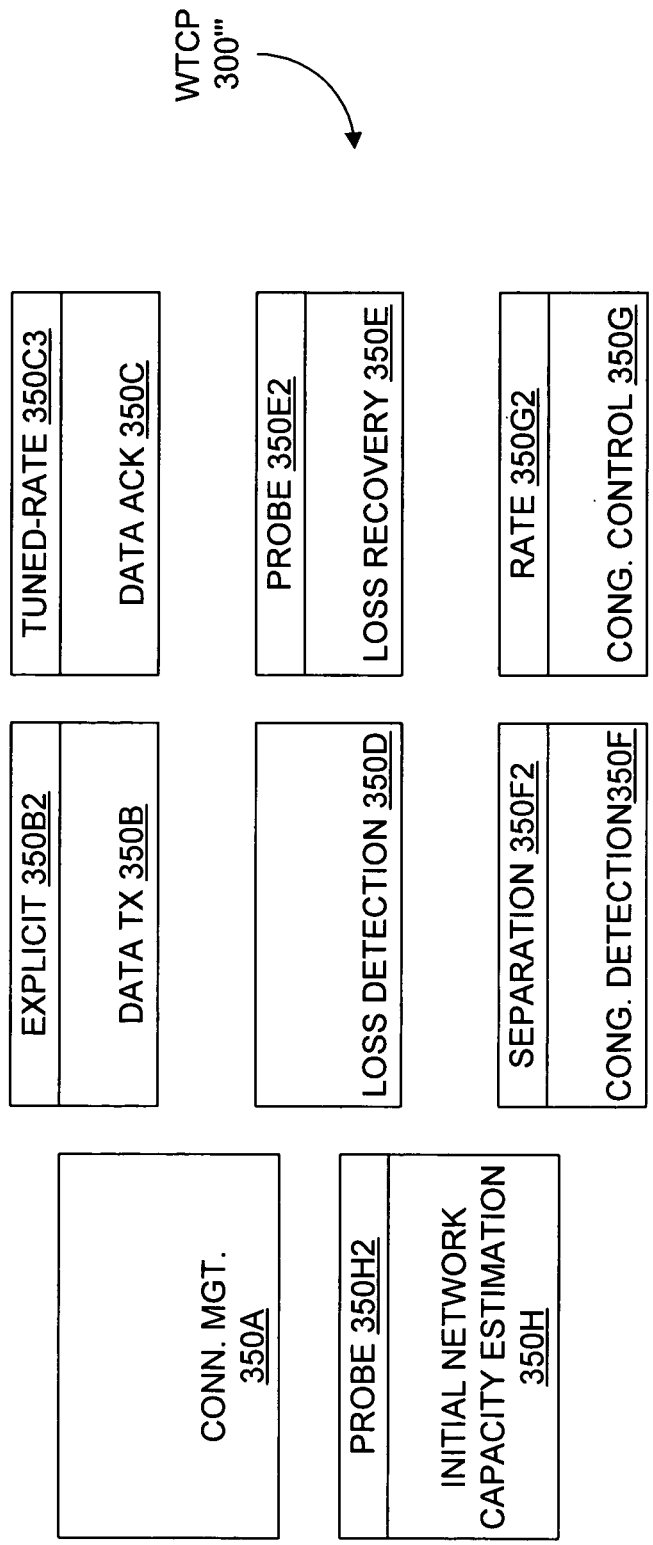

One skilled in the art of transport protocols will understand that the generic transport protocol 300 of FIG. 3B does not represent an actual protocol. Instead, FIG. 3B is a collection of mechanisms, each of which could be used to implement a particular module. FIG. 4A-C illustrate real-world transport protocols, showing the particular mechanisms used in these protocols.

FIG. 4A is a functional block diagram of the TCP protocol (300'). TCP 300' uses a self-clocked mechanism 350B1 for data transmission. A self-clocked mechanism 350C1 is also used for data acknowledgement. The mechanism for congestion detection in TCP 300' is loss-based (350F1), and the congestion control mechanism is window-based (350G1). Loss recovery in TCP 300' is 350E1, and the estimation mechanism is slow-start (350H1).

The Satellite Transport Protocol (STP) 300" shown in FIG. 4B differs from TCP 300' in a few mechanisms. The congestion control mechanism in STP 300" is a hybrid (350G3) of window-based and rate-based. The mechanism used for acknowledgement is polled (350C2) rather than self-clocked.

FIG. 4C is a functional block diagram of the WTCP protocol (300'''), which uses a very different combination of mechanisms. In WTCP 300''', data transmission uses an explicit-capacity mechanism 350B2 and data acknowledgement uses a tuned-rate mechanism 350C3. Congestion detection in WTCP 300''' is inter-packet-separation (350F3), and congestion control is rate-based (350G2). The mechanism for loss recovery is probe-based (350E2), and the estimation mechanism also uses probing (350H2).

The protocols illustrated in 4A-C are merely examples of a few combinations of transport mechanisms. One skilled in the art will appreciate that the dynamically adaptive transport protocol architecture allows transport mechanisms be combined in many different ways, to form transport protocols with varying characteristics. Thus, new combinations, each optimized for a particular network environment, can be created using the dynamically adaptive transport protocol architecture.

The dynamically adaptive transport protocol architecture contemplates more than partitioning protocol functionality into mechanisms. By allowing mechanisms to be combined at run-time, the dynamically adaptive transport protocol architecture allows a transport protocol 300 constructed in accordance with the dynamically adaptive transport protocol architecture to alter its behavior at run-time. These features of the dynamically adaptive transport protocol architecture will now be discussed in further detail.

Figure 5:
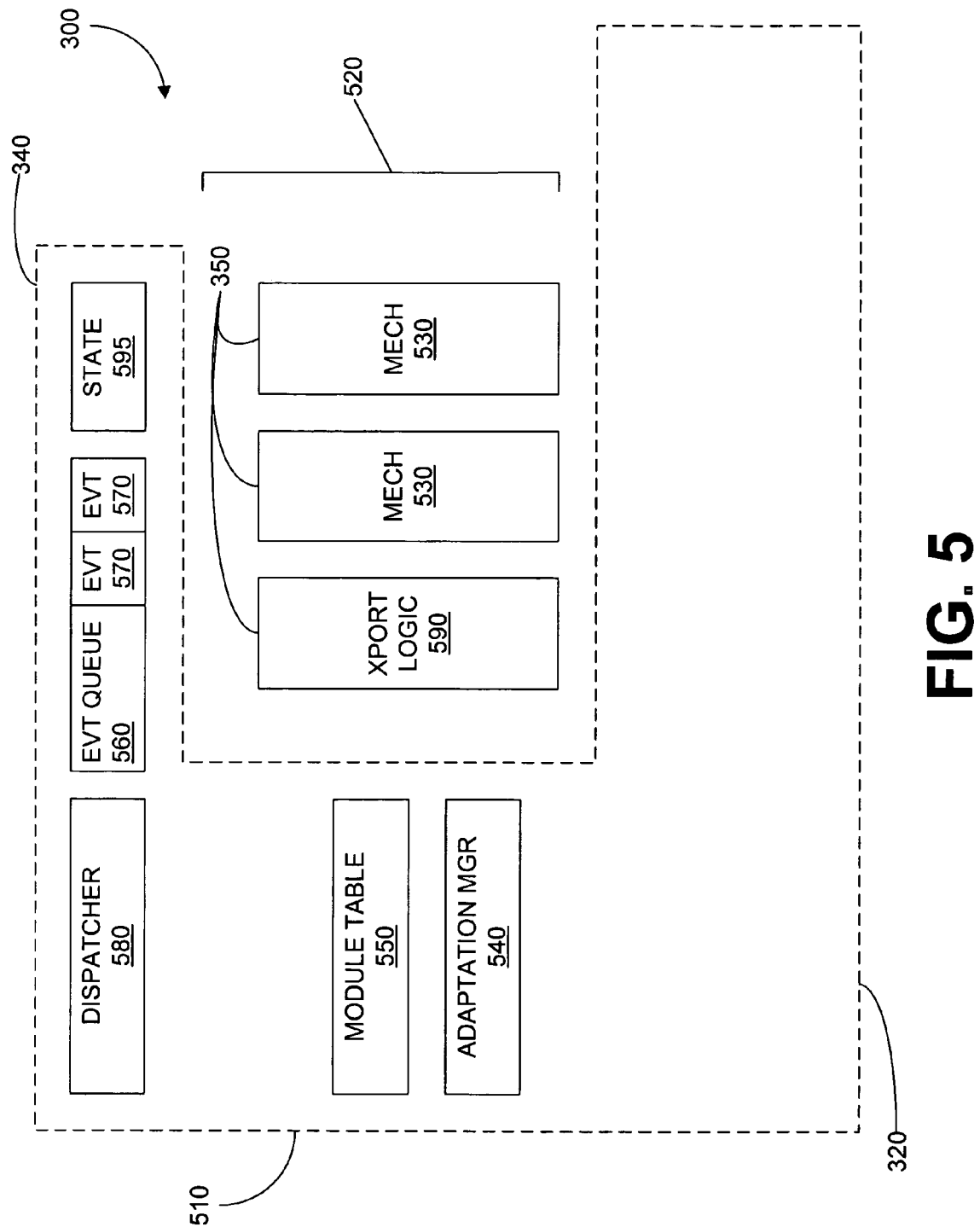
FIG. 5 is a high-level block diagram of the transport protocol 300 of FIG. 3.

FIG. 5 is a high-level block diagram of the transport protocol 300 in accordance with the dynamically adaptive transport protocol architecture. The transport protocol 300 comprises a core portion 510 and a non-core portion 520. The core portion 510 is transport-independent, and remains in memory regardless of which transport protocol is in use. For this reason, the lower-edge interface 320 and the upper-edge interface 340 reside in the core portion 510.

The non-core portion 520 is specific to a particular transport protocol implementation. This non-core, transport-specific portion 520 is composed of multiple modules 350, each implementing a mechanism 530. Several existing protocols, discussed earlier in connection with FIGS. 3A-D, were described as being specific combinations of mechanisms 530. However, the dynamically adaptive transport protocol architecture is not limited to these example mechanisms 530: a transport protocol 300 in accordance with this architecture can comprise any combination of the previously-described mechanisms, or even new mechanisms that are created to be optimized for a particular network environment. Thus, the dynamically adaptive transport protocol architecture can be used to create a virtually unlimited number of transport protocols 300.

Figure 7A:
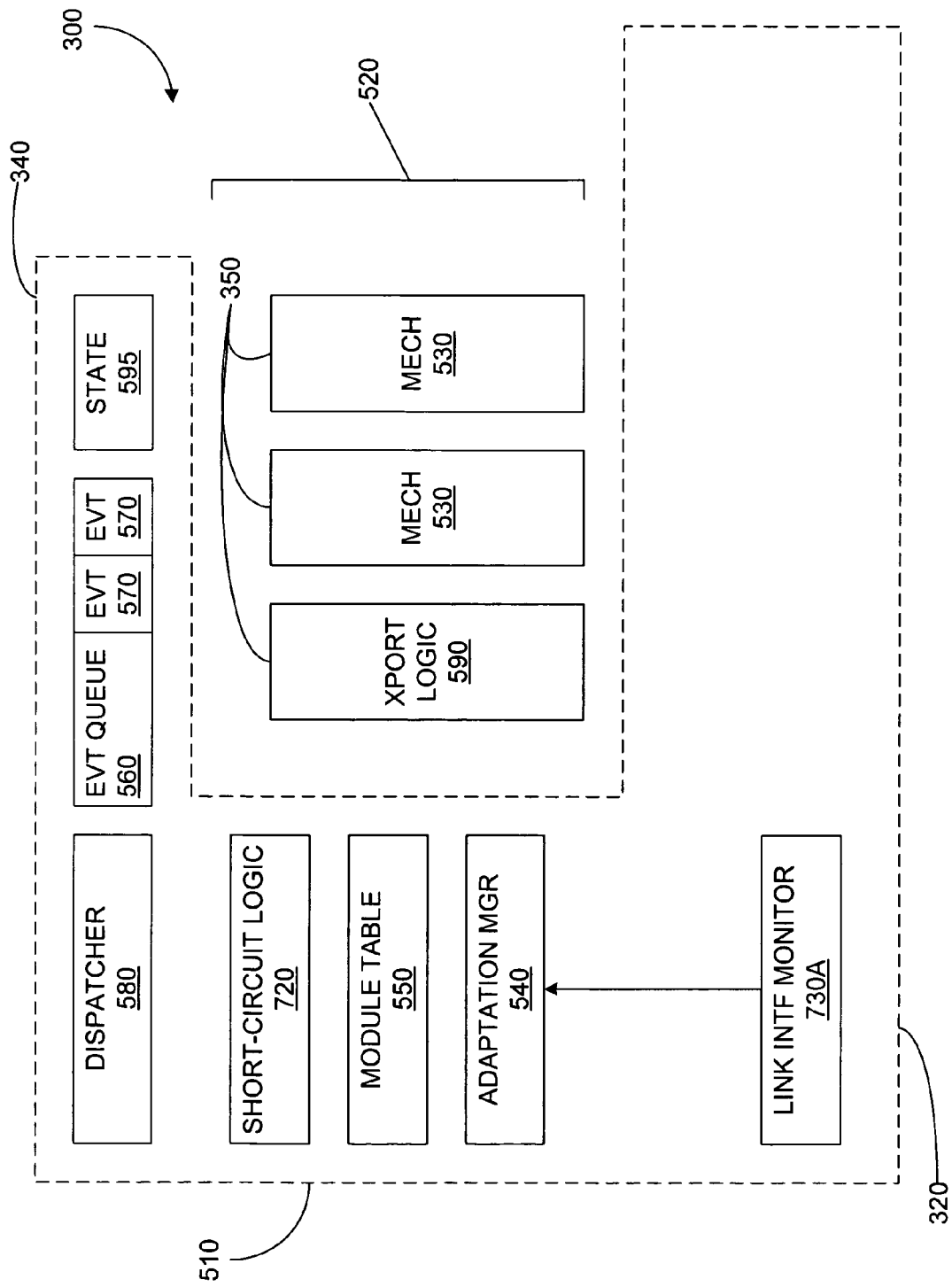
FIGS. 7A and 7B are block diagrams of other embodiments of the transport protocol 300 of FIG. 3.
Figure 7B:
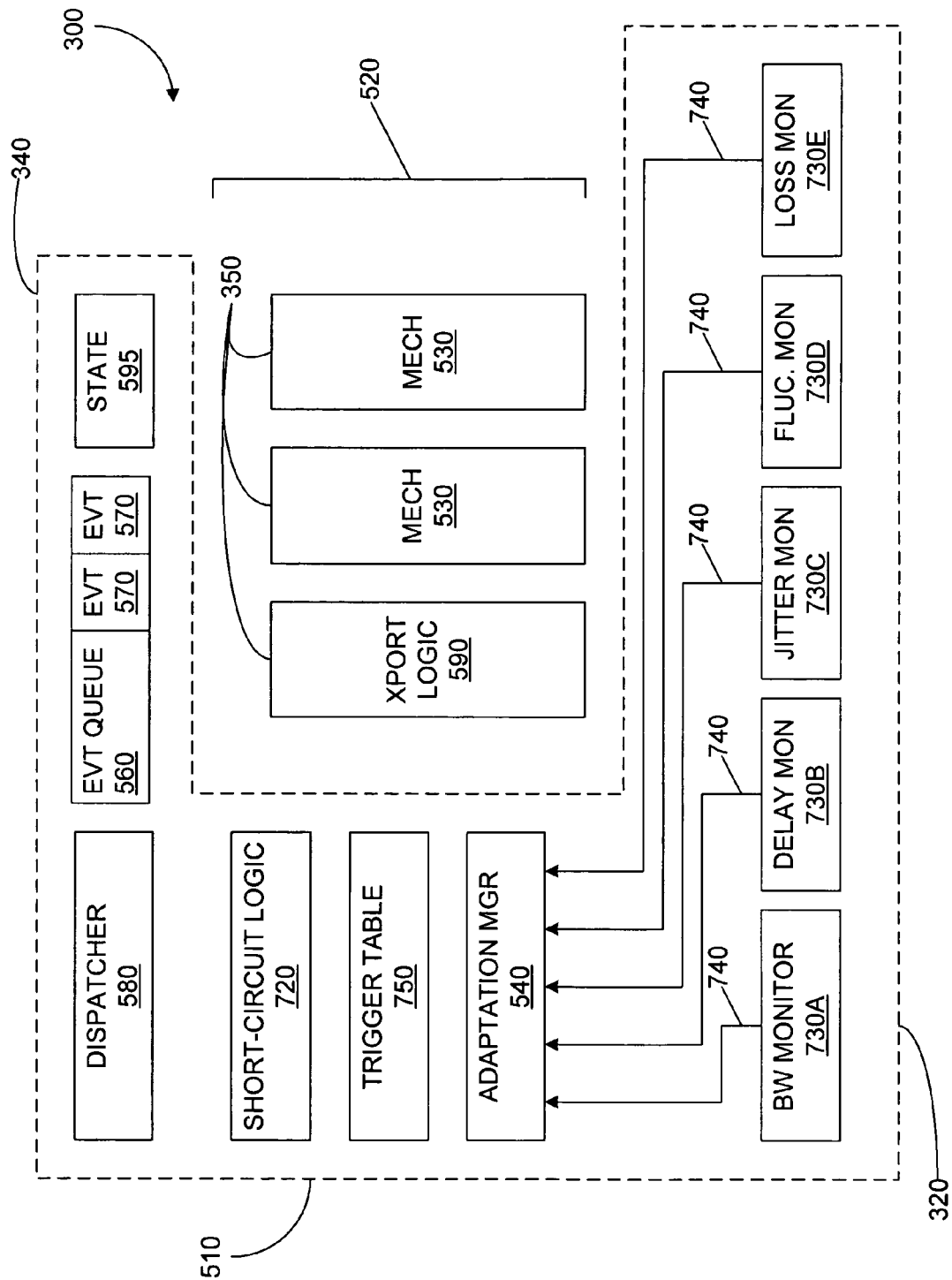

Each module 350 can be swapped in and out of memory at run-time by the adaptation manager 540 in the core portion 510. In the embodiment of FIG. 5, the adaptation manager 540 loads an entire set of modules 350 which together to form a transport protocol 300. In this embodiment, a transport protocol 300 is composed of a fixed set of modules, and reconfiguration of the protocol in response to changing network conditions comprises swapping from one protocol implementation to another. In other embodiments, described in further detail in connection with FIGS. 7A and 7B, a transport protocol 300 can be reconfigured in response to changing network conditions by swapping mechanisms 530. Thus, the granularity for adaptation in the embodiment of FIG. 5 is the transport protocol, while the granularity for adaptation in the embodiment of FIGS. 7A and 7B is the mechanism.

In the embodiment of FIG. 5, a module table 550 lists the set of modules 350 which make up a particular transport protocol 300. The module table 550 also contains a reference to a transport logic module 590 which maps events 560 to mechanisms 530 in a transport-specific manner. In a preferred embodiment, the module table 550 is a file located in non-volatile storage 240 (see FIG. 2).

At boot-up, the adaptation manager 540 performs an initial load of the set of modules 350 specified in the module table 550. If network conditions change, the adaptation manager 540 unloads the set of currently-loaded modules 350 from memory and loads a new set of modules 350 into memory from non-volatile storage 240 (see. FIG. 2), using kernel services as necessary. For example, a system administrator may use a utility program to force the swap from one transport-layer protocol to another. Note that there may be overlap in the first and second sets of modules. In this case, any commonly-shared module 350 remains in memory rather than being unloaded and loaded again.

Note that modules 350 are related to mechanisms 530, but are not identical: each mechanism 530 is a function within a module 350. A module 350 is a collection of one or more mechanisms 530, packaged in such a manner that the entire module 350 can be loaded and unloaded from memory at run-time. The packaging is specific to the operating system on which the transport protocol 300 executes. In one embodiment using Linux as an operating system, the package is a kernel loadable module. In another embodiment using Microsoft Windows as an operating system, the package is a dynamically loadable library (DLL).

In a preferred embodiment, each module 350 contains exactly one mechanism 530. This approach results in a smaller module 350 as compared to one containing multiple mechanisms 530, which in turn results in reduced time for swapping the module 350 in and out of memory.

The dynamically adaptive transport protocol architecture is event-driven. Each particular transport protocol 300 responds to a set of transport-layer events. This set includes events arriving from the lower edge interface 320, from the upper edge interface 340, from any other interface to the transport protocol 300, or from modules 350 within the transport protocol 300. These transport-layer events 560 are stored in an event queue 570 located in the core portion 510.

An event dispatcher 580, also in the core portion 510, remove events from the event queue 570 and delivers them to one or more transport-layer mechanisms 530. The mapping between events 560 and mechanisms 530 is specified by transport logic 590, located in the transport-specific portion 520. In one embodiment, the transport logic 590 is simply a table containing an ordered list of mechanisms 530, and the dispatcher 580 executes the mechanisms 530 in order.

Communication between non-core modules 350 takes place via events 560. In a preferred embodiment, all calls into a module 350 occur indirectly via events rather than via direct function calls. Modules 350 can also communicate through public state data 595, which is maintained by the core portion 510. This allows a module 350 which is being swapped out to pass data to another module 350 which is being swapped in.

The combination of a swappable transport logic 590 and inter-module communication via events offers several advantages. By mapping events 560 to mechanisms 530, the transport logic 590 controls the intelligence embodied in the various mechanisms 530. This transport logic 590 is swappable, so that this intelligence is reconfigurable at run-time: one set of event-to-mechanism mappings can be swapped for another. Finally, when this mapping is changed, the operating system loader is not required to fix-up or resolve function addresses, since events 560 are used for inter-module communication instead of function calls.

A transport protocol can be partitioned in a variety of ways. The dynamically adaptive transport protocol architecture partitions in a specific manner: the protocol is divided into transport mechanisms. Choosing to partition in this specific manner has several advantages. First, a mechanism 530 is relatively small, so that the time required to swap is relatively small. Also, when the same mechanism 530 shared by more than one protocol (e.g., as TCP 300' and TCP-ELN 300*), that mechanism 530 is stored once rather than being duplicated within several monolithic protocols. This reduces the total storage required for all the protocols in the client network device 200 (see FIG. 2), which is especially important for embedded network devices.

FIGS. 6A-D are event flow diagrams (also known as state diagrams) for four existing transport protocols: TCP, TCP-ELN, WTCP, and STP. These event flow diagrams show which mechanisms 530 are implemented by the modules 350 in each protocol, as did the diagrams of FIGS. 3B-D. In addition, these event flow diagrams show which events 560 are handled by which mechanisms 530.

Since event flow diagrams are easily understood by one of ordinary skill in the art, FIGS. 6A-D will not be discussed in exhaustive detail. Instead, some differences between the protocols will be highlighted, so that the advantages of the dynamically adaptive transport protocol architecture in accommodating the differences can be more readily understood.

Figure 6A:
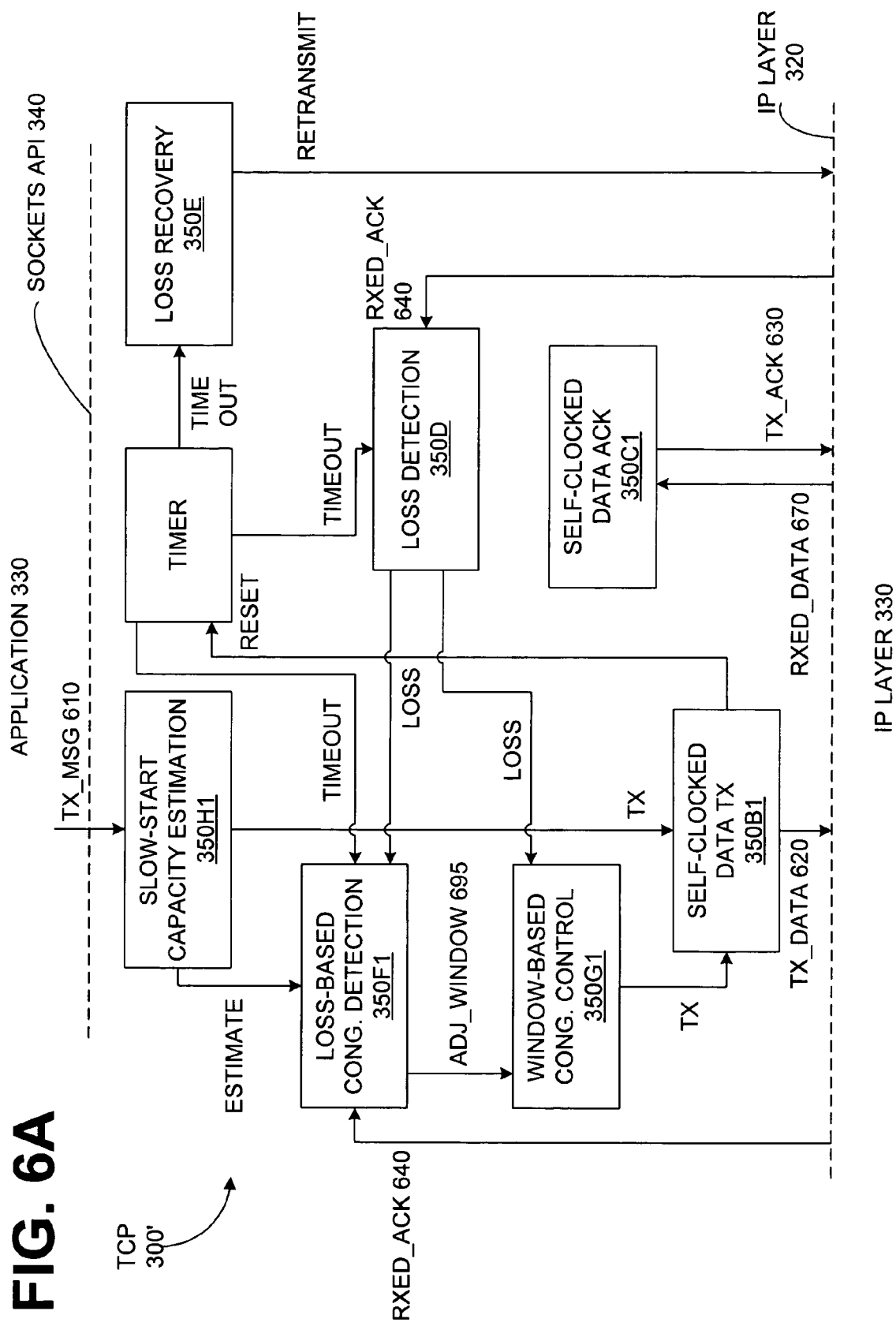

As can be seen in FIGS. 6A-D, the input events to the dynamically adaptive transport protocol architecture from the application layer (340) and the IP layer (320) are similar in these protocols. All of the protocols process TX_MSG (610), TX_DATA (620), TX_ACK (630), and RXED_ACK (640) events. Furthermore, the overall flow of events is similar in TCP 300' (FIG. 6A), TCP-ELN 300* (FIG. 6B), and STP 300" (FIG. 6C).

In particular, the state diagrams in FIG. 6A for TCP 300' and in FIG. 6B for TCP-ELN 300* are very similar, except that in TCP-ELN 300* the Loss_Detection handler (350D) is invoked in response to an explicit loss notification (RXED_ELN) event (650) as well as a regular acknowledgement event (640). In STP 300" (FIG. 6C), the overall flow of events is similar to TCP 300', but the mechanisms used to respond to these events are different. Specifically, the data acknowledgement module uses a polled mechanism (350C2), and the congestion control module uses a hybrid mechanism (350G3). In addition, the polled acknowledgement mechanism (350C2) in STP 300" responds to a RXED_POLL event 660, rather than a RXED_DATA event 670 as in TCP 300'.

WTCP 300''', in FIG. 6D, has fewer similarities to the other three protocols. Almost all of the mechanisms used by WTCP 300''' are different: inter-packet-separation congestion detection 350F3, tuned-rate acknowledgement 350C3, and probe-based loss recovery 350E2. WTCP 300''' uses basically the same set of events as do the other protocols (with the addition of a TX_PROBE event 680), but has much fewer event transitions: 12 transitions compared to 17 in TCP 300'.

The event-driven execution model of the dynamically adaptive transport protocol architecture differs from the conventional event-driven approach. To understand how, consider that in TCP, the receipt of an acknowledgement affects loss detection, congestion detection, and congestion control. In the conventional approach, an event, and the mechanism 530 which handles it, is relatively coarse-grained. Specifically, in a conventional TCP implementation, the handler for an ACK_RXED event 640 determines whether or not a packet has been lost, and if so, determines if the loss implies congestion, and if so, adjusts the congestion window.

In contrast, the events in a TCP protocol using the dynamically adaptive transport protocol architecture are relatively fine-grained, as can be seen in FIG. 6A. The handler for an ACK_RXED event 640 is a Loss_Detection mechanism 350D. This mechanism 350D determines whether or not a packet has been lost, but is not involved in congestion detection or control. Instead, the loss detection mechanism 350D generates a new LOSS_DETECTED 690 event. Next, the transport logic 590 for TCP 300' delivers the LOSS_DETECTED event 690 to the Congestion_Detection mechanism 350F1. The Congestion_Detection mechanism 350F1 determines that congestion has been detected, but does not attempt to control the congestion. Instead, the Congestion_Detection mechanism 350F1 generates a new ADJ_WINDOW event 695, which is handled by the Congestion_Control mechanism 350G1. Thus, the types of actions taken by the various mechanisms 530 in response to events 560 are more limited compared to their counterparts in a conventional TCP implementation.

Returning now to FIG. 5, in the dynamically adaptive transport protocol architecture the "intelligence" of the transport protocol is implemented in the non-core transport-specific portion 520, while the core portion 510 provides "glue." Thus, the dispatcher 580 and the event queue 570 are located in core portion 510, while the transport logic 590 and mechanisms 530 reside in modules 350 within the transport-specific portion 520.

More specifically, this intelligence is captured in two ways. First, the transport logic 590 maps events 560 to mechanisms 530 in a transport-specific manner. One example of this behavior can been seen in the state diagram for TCP 300' in FIG. 6A. The Loss_Detected event 690 is delivered to two handlers: a first handler in a Congestion_Detection module 350F1; and a second handler in a Congestion_Control module 350G1. A contrasting behavior can be seen in the state diagram for WTCP 300''' in FIG. 6D, where a Loss_Detected event 690 is delivered to a single handler in a Loss_Recovery module 350E2.

The second way in which the transport-specific portion 520 captures protocol intelligence is that the mechanisms 530 react to the events 560 in transport-specific ways. For example, in both TCP 300' and STP 300", the Adjust_Window event 695 is delivered to a handler in a Congestion_Control module 350F. However, in TCP 300' the congestion control is window-based (350G1), and in STP 300" the congestion control is a hybrid (350G3) of rate-based and window-based.

Although transport logic 590 is not shown explicitly in the state diagrams of FIGS. 6A-D, it is transport logic 590 that drives the state machine. As explained earlier, transport logic 590 decides which mechanisms 530, or handlers, is executed in response to an event.

The previous discussion focused on the features of the dynamically adaptive transport protocol architecture which allow various mechanisms 530, in combination with a transport logic 590 that maps events 560 to these mechanisms 530, to be combined to produce a specific transport protocol 300. Next, the process of reconfiguring transport protocol 300 at run-time will be examined, in connection with FIGS. 7A and 7B.

As discussed earlier in connection with FIG. 2, the dynamically adaptive transport protocol architecture allows a transport protocol 300 to adapt its behavior at run-time to changing network characteristics, which is an improvement over conventional transport protocol architecture. FIGS. 7A and 7B are alternative embodiments of the dynamically adaptive transport protocol architecture, differing mainly in what triggers the adaptation.

In the embodiment of FIG. 7A, the adaptation is triggered by a switch from one network interface 220 on client network device 200 to another (e.g., from a WiFi interface to a 3G data interface, from a WiFi interface to a Ethernet interface, etc.) Each network interface 220 is associated with a transport protocol 300. As described earlier in connection with FIG. 5, each transport protocol 300 is associated with a module table 550 which lists the modules 350 which make up a particular transport protocol 300, and which maps events 560 to mechanisms 530.

A link interface monitor 710 notifies the adaptation manager 540 when the network interface 220 (see FIG. 2) changes. (The link interface monitor 710 detects the change in a way that is specific to the access network, for example, by detecting a change in the media access control (MAC) address or in the IP address.) The adaptation manager 540 responds to the link interface indication by loading the modules 350 and transport logic 590, as specified by the module table 550.

The transport protocol reconfiguration procedure is transparent to the application 330, but the procedure is not instantaneous. The dynamically adaptive transport protocol architecture provides for non-interrupted continued operations during reconfiguration, through short-circuit logic 720 implemented in the core portion 510. The short-circuit logic 720 provides simplified transport functionality during the reconfiguration, thus "short-circuiting" the normal path for data and events. Short-circuit logic 720 buffers incoming packets (in state 595), performs connection maintenance as needed, and ensures reliable delivery. To avoid the need for large data buffers, the short-circuit logic 720 overrides the old congestion control mechanism 350G, and instead transmits packets at a constant rate (appropriate to the network interface 220) until the new congestion control mechanism 350G is finished loading.

During reconfiguration, delivery of events 560 destined for the new modules 350 is suppressed by the core portion 510. These events 560 are instead used by the core portion 510 to appropriately update the state 595 of the new connection. When the adaptation manager 540 has finished loading the new modules 350, the short-circuit logic 720 is replaced by the transport logic 590, and the dispatcher 580 resumes delivery of events 560. Events 560 are now delivered to a new set of mechanisms 530, through the transport logic 590, and the updated state 595 is available to the new mechanisms 530.

In an alternative embodiment, shown in FIG. 7B, the adaptation is triggered by a change in network performance as measured by specific performance parameters. Examples of measurable network performance parameters include available bandwidth, packet loss, jitter, and network delay. Empirical research has shown that for each area of transport functionality (e.g. data transmission 350b, congestion detection 350f), some performance parameters are relevant to choosing an appropriate mechanism 530 for implementing that functional area, while other performance parameters are not as relevant. For example, variation in loss rate and in bandwidth dominate the choice of the data transmission mechanism 350B because these parameters are the ones that affect how the data transmission mechanism 350B performs, while average bandwidth, average delay, and average jitter do not have such an effect.

In a wireless context, the root cause of the performance change might be client network device 200 moving from one wireless network to another (a "vertical handoff"), or moving among access points or base stations within the same wireless network (a "horizontal handoff"). In a wired context, changes in network characteristics are often due to congestion-related queuing, route changes in the wide-area network, or node failures. In either context, the performance of the network is measurably different than before, so that the dynamically adaptive transport protocol architecture can adapt to this change.

In the embodiment of FIG. 7B, the adaptation manager 540 receives notifications from one or more trigger monitors 730 when specific performance triggers 740 are met. A trigger 740 comprises a specific performance parameter (e.g., bandwidth, packet loss, etc.) and a threshold value. In a preferred embodiment, the variation in a parameter, and/or the average of a parameter, is used as a trigger rather than the instantaneous parameter value. In one embodiment, the trigger 740 also specifies a comparison: trigger when the parameter goes above the threshold, below the threshold, etc.

Examples of performance parameters include (but are not limited to): bandwidth; variation in bandwidth (also known as bandwidth fluctuation); delay; jitter (variation in delay); and packet loss rate. Corresponding trigger monitors are bandwidth monitor 730A, fluctuation monitor 730B, delay monitor 730C, jitter monitor 730D, and packet loss monitor 730E.

In response to the trigger indication, the adaptation manager 540 determines which mechanisms 530 and/or transport logic 590 are appropriate for the new condition, and uses the services of the adaptation manager 540 to load the modules 350 containing the mechanisms 530 and/or transport logic 590. In a preferred embodiment, a trigger table 750 associated with each trigger 740 identifies the mechanisms 530 and transport logic 590 to be loaded in response to the trigger 740.

Table 1 is an simplified trigger table 750. For clarity, this table lists the functional area implemented by the mechanism, although an actual trigger table 750 would have no need for this. Also, an actual trigger table 750 would have numeric values for the threshold, while this example merely indicates a relative "low" or "high." Note that a trigger can contain a combination of multiple parameters.

TABLE 1

| PARAMETER | THRESHOLD | FUNCTIONAL AREA | MECHANISM |
|---|---|---|---|
| bandwidth variation or avg. packet loss | low low | data transmission | self-clocked |
| bandwidth variation or avg. packet loss | high high | data transmission | explicit capacity |
| bandwidth variation or avg. bandwidth | low low | congestion control | window-based |
| bandwidth variation or avg. bandwidth | high high | congestion control | rate-based |
| avg. loss or delay variation | low high | congestion detection | loss-based |
| avg. loss | high | congestion | delay-based |

TABLE 1-continued

| PARAMETER | THRESHOLD | FUNCTIONAL AREA | MECHANISM |
|---|---|---|---|
| or delay variation | low | detection | |
| avg. loss or delay variation | low high | acknowledgment | self-clocked |
| avg. loss or delay variation | high low | acknowledgment | tuned |
| delay variation | low | loss recovery | timeout-based |
| delay variation | high | loss recovery | probe-based |
| avg. bandwidth times avg. delay | low | startup capacity estimation | slow-start |
| avg. bandwidth times avg. delay | high | startup capacity estimation | packet pair probe |

In the above discussion, triggers 740 were used on a per-mechanism basis. In another embodiment, a trigger table 750 can specify that an entire transport protocol 300 be swapped in. In this embodiment, the trigger 740 can be associated with a relative or absolute time at which the switch in protocols will occur.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

What is claimed is:

1. A system for dynamically adapting a transport-layer protocol, comprising:
    a transport-layer protocol configured to interface with a network layer protocol, wherein the transport-layer protocol comprises a plurality of swappable transport-layer mechanisms, each transport-layer mechanism of the plurality of transport-layer mechanisms implementing a specific area of transport-layer functionality of the transport layer protocol;
    a processor coupled to a local interface;
    a memory coupled to the local interface; and
    transport-protocol logic stored in the memory and executable by the processor, the transport-protocol logic comprising:
    monitor logic configured to detect a change in at least one network performance condition of a network communicatively coupled to the network interface; and
    adaptation logic configured to unload a first transport-layer mechanism of the plurality of transport-layer mechanisms and load a second transport-layer mechanism of the plurality of transport-layer mechanisms at run time and in response to a notification by the monitor logic.

2. The system of claim 1, the protocol logic further comprising:
    transport logic configured to associate each of a plurality of transport-layer events with one of the plurality of transport-layer mechanisms; and
    dispatcher logic configured to deliver the transport-layer events to the associated transport-layer mechanism.

3. The system of claim 2, the adaptation logic further configured to load the transport logic in response to the change in the network performance condition.

4. The system of claim 2, the adaptation logic further configured to load the transport logic in response to a change in the binding between the network interface and the protocol stack.

5. The system of claim 2, the monitor logic further configured to compare the network performance condition to a threshold.

6. The system of claim 2, the monitor logic further configured to provide an indication that condition has been met, the indication specifying a transport-layer mechanism.

7. The system of claim 2, further comprising: means for sharing state between the unloaded mechanism in the first plurality and the newly loaded mechanism.

8. The system of claim 1, the protocol logic further comprising: short-circuit logic configured to provide transport-layer functionality during reconfiguration of the transport-layer protocol and to buffer data and events until the reconfiguration has completed, the short-circuit logic remaining in memory while the transport-layer protocol is in use.

9. A method for reconfiguring a transport-layer protocol, comprising logic for performing the steps of:
    performing, using a processor, an initial load of a first plurality of transport-layer mechanisms into a memory, each of the transport-layer mechanisms residing in a dynamically loadable module, the first plurality of transport-layer mechanisms defining a transport-layer protocol, wherein each transport-layer mechanism of the first plurality of transport-layer mechanisms implements a specific area of transport-layer functionality of the transport layer protocol, and wherein the transport layer protocol is configured to interface with a network layer protocol;
    unloading, at run time, from the memory a first transport-layer mechanism of the first plurality of transport-layer mechanisms implementing the transport-layer protocol; and
    loading, at run time, into the memory at least a second transport-layer mechanism of the first plurality of transport-layer mechanism, the second transport-layer mechanism being different than the first transport-layer mechanism of the first plurality of transport mechanisms, thereby swapping, the first transport-layer mechanism of the first plurality of transport-layer mechanisms with at least the second transport-layer mechanism different than the first transport-layer mechanism of the first plurality of transport mechanisms.

10. The method of claim 9, wherein the loading and unloading steps are performed in response to a change in at least one network performance condition of a network communicatively coupled to the network interface.

11. The method of claim 9, wherein the loading and unloading steps are performed in response to a change in the binding between the network interface and the protocol stack.

12. The method of claim 9, wherein the loading and unloading steps are performed in response to a user command.

13. The method of claim 9, the program further comprising logic for performing the step of: loading into the memory a transport logic module, the transport logic module mapping each of a plurality of transport-layer events to one of the plurality of transport-layer mechanisms.

14. The method of claim 13, wherein the step of loading a transport logic module is performed in response to a change in at least one network performance condition of a network communicatively coupled to the network interface.

15. The method of claim 13, wherein the step of loading a transport logic module is performed in response to a change in the binding between the network interface and the protocol stack.

16. The method of claim 9, the program further comprising logic for performing the steps of:
monitoring at least one network performance condition of a network communicatively coupled to the network interface, the condition specified by a trigger; and
upon the condition being met, loading a module containing a transport-layer mechanism associated with the trigger.

17. The method of claim 16, the program further comprising logic for performing the step of: comparing the network performance condition to a threshold associated with the trigger.

18. The method of claim 16, the program further comprising logic for performing the step of: providing an indication that the trigger condition has been met, the indication specifying a transport-layer mechanism.

19. The method of claim 9, the program further comprising logic for performing the step of: executing, in response to a transport-layer event, one of the transport-layer mechanisms.

20. The method of claim 9, the program further comprising logic for performing the steps of:
mapping a transport-layer event to a specified one of the transport-layer mechanisms; and
executing the specified transport-layer mechanism in response to the transport-layer event.

21. The method of claim 9, the program further comprising logic for performing the steps of: loading a short-circuit module which provides transport-layer functionality during reconfiguration of the transport-layer protocol and buffers data and events until the reconfiguration has completed, the short-circuit module remaining in memory while the transport-layer protocol is in use.

22. The method of claim 9, the program further comprising logic for performing the step of: providing data which is shareable between the unloaded mechanism in the first plurality and the newly loaded mechanism.

23. A system for dynamically adapting a transport-layer protocol, comprising:
a transport-layer protocol comprising a plurality of transport-layer mechanisms, each transport-layer mechanism of the plurality of transport-layer mechanisms implementing a specific area of transport-layer functionality of the transport layer protocol, wherein transport-layer functionality comprises loss recovery, loss detection, or initial path detection, or a combination thereof, and wherein the transport layer protocol is configured to interface with a network layer protocol;
a processor coupled to a local interface;
a memory coupled to the local interface; and
transport-protocol logic stored in the memory and executable by the processor, the transport-protocol logic comprising:
monitor logic configured to detect a change in at least one network performance condition of a network communicatively coupled to the network interface; and
adaptation logic configured to swap a first transport-layer mechanism of the plurality of transport-layer mechanisms with a second transport-layer mechanism of the plurality of transport-layer mechanisms at run time and in response to a notification by the monitor logic.

* * * * *